Figure 1:
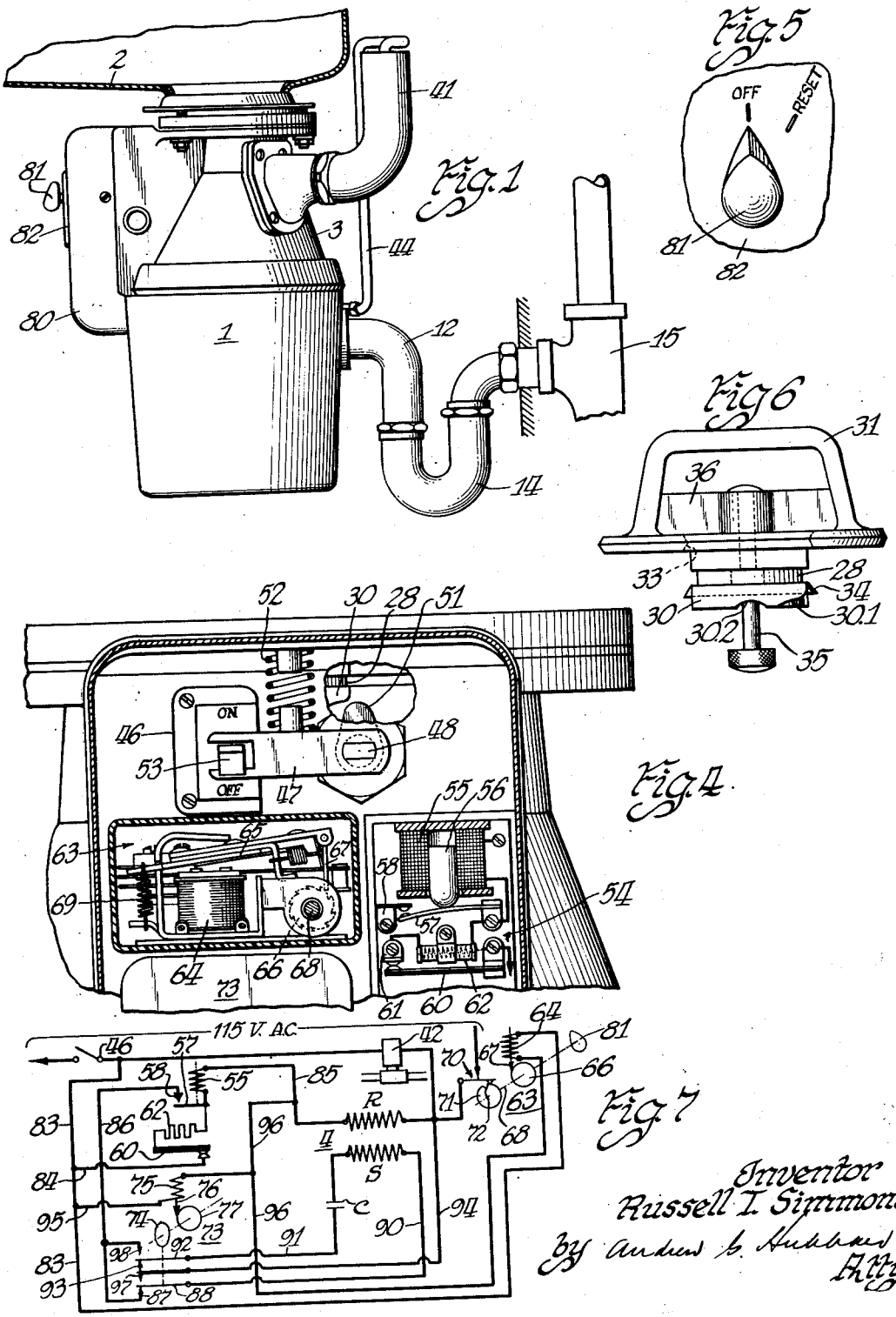

May 18, 1954  R. T. SIMMONS  2,678,775
WASTE DISPOSAL APPARATUS WITH AUTOMATIC
ELECTRICAL REVERSING CONTROL
Filed Nov. 29, 1951  2 Sheets-Sheet 1

May 18, 1954

R. T. SIMMONS 2,678,775

WASTE DISPOSAL APPARATUS WITH AUTOMATIC
ELECTRICAL REVERSING CONTROL

Filed Nov. 29, 1951

2 Sheets-Sheet 2

Inventor
Russell T. Simmons

Patented May 18, 1954

2,678,775

UNITED STATES PATENT OFFICE 2,678,775

WASTE DISPOSAL APPARATUS WITH AUTOMATIC ELECTRICAL REVERSING CONTROL

Russell T. Simmons, Bellwood, Ill., assignor to General Electric Company, a corporation of New York Application November 29, 1951, Serial No. 258,770

6 Claims. (Cl. 241—32.5)

This invention relates to waste disposal apparatus such as the so termed "garbage disposers" used in domestic and commercial kitchens for reducing food scraps and other kitchen waste to small particle size in the presence of water for discharge to the plumbing waste line of the building.

The most popular types of food waste disposers comprise a comminution chamber fixed beneath the kitchen sink at the drainage opening thereof and have a removable closure which optionally combines the function of the usual sink stopper with that of providing a chamber entrance fitting which may be removed when it is desired to place waste into the chamber and replaced and locked in position to seal the chamber during the operation of the disposer. Within the chamber are means for mechanically reducing the waste to small particle size; for example, the bottom wall of the chamber may comprise a horizontally rotatable motor driven flywheel having impellers which drive the waste against fixed shredder elements extending into the chamber from the lower sidewall portions thereof. This operation is carried out in the presence of water introduced by suitable means into the chamber, and a slurry of waste particles and water passes through drainage ports into the plumbing waste system of the building.

The drive motors are usually of not more than one-third horsepower, and it sometimes happens that bony wastes or gristly materials will jam between an impeller and a shredder element, stalling the motor by locking the flywheel against rotation. Some waste disposal machines use reversing type motors and provide manual controls by which the motor may be reversed in an attempt to clear the jam; and experience indicates that the average jammed condition may be cleared after one or two reversals of the motor.

It is an object of my invention to provide a control system for garbage disposal apparatus which will automatically operate means establishing a motor-reversing circuit when the current drawn by the motor increases abnormally because of a jammed flywheel or any other reason.

It is another object of my invention to provide an automatic motor-reversing system as above noted which will open a master control switch after a predetermined maximum number of reversals to terminate the operation of the machine to avoid damage in the event that the jammed condition is of such serious nature that it cannot be cleared by motor reversal.

It is a further object of my invention to provide an automatically reversing waste food disposer in which the flow of water supplied to the comminution chamber will continue during the automatic reversal operations of the disposer but will terminate upon operation of the master control switch at the end of the said predetermined maximum number of reversals.

In a presently preferred embodiment of the invention, I utilize a pair of stepping or ratchet relays in circuit with the usual motor overload protection device and so arrange the relays that each operates in a predetermined manner whenever the overload protection device has opened the motor circuit following a stalled motor condition. One of the stepping relays operates a motor-reversing switch at each step of its operation so as to establish the motor circuit for reversal of direction each time the circuit is reclosed following a stalled condition. For example, such reclosure of the motor circuit may result from the automatic resetting of a thermal cutout element of the overload protection device following a short cool-down period. The other stepping relay is arranged to open a master circuit switch after a predetermined maximum number of operations of the overload protection device. Reset means are provided at the last named stepping relay to permit the master switch to be manually reclosed for further operation of the disposer.

Features of my invention, therefore, are that a motor-reversing circuit is automatically established whenever the current drawn by the motor approaches a level characteristic of a locked rotor condition, and that means are provided to automatically limit the number of times the motor control circuit may automatically be reclosed during such current-demand condition.

Figure 2:
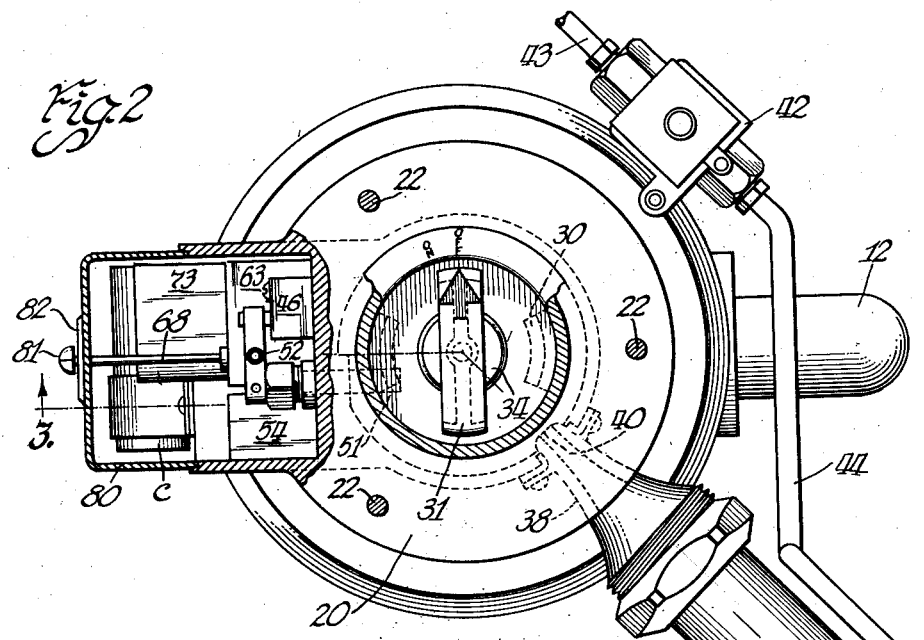
Figure 3:
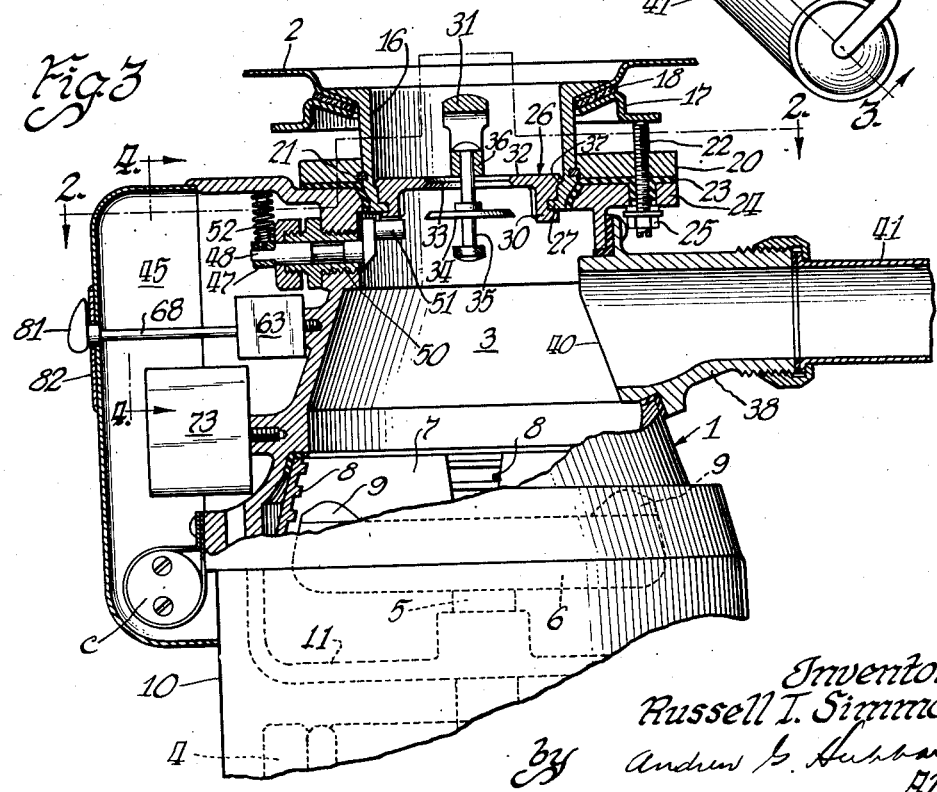

Other features and advantages of the invention will be understood from the following detailed description of a presently preferred embodiment, read in conjunction with the accompanying drawings in which: Fig. 1 is a side elevation of a garbage disposal unit affixed to a kitchen sink (shown in section) and indicating a common method of connection to a building waste line; Fig. 2 is a plan view of the disposer taken in section on lines 2—2 of Fig. 3; Fig. 3 is a sectional side elevation of the upper portion of the waste disposer taken on line 3—3 of Fig. 2; Fig. 4 is a fragmentary side elevation of the waste disposer showing an arrangement of control devices; Fig. 5 is a fragmentary side elevation showing the master control switch reset knob; Fig. 6 is a side elevation of a sink drain closure; and Fig. 7 is a schematic wiring diagram.

A waste disposal apparatus 1 is suspended from the basin of a kitchen sink 2, as by the conventional fittings shown in Fig. 3. For example, the disposal apparatus may include a casting forming a comminution chamber 3 to the bottom of which is attached by any suitable means a motor 4 carrying on a vertically extending shaft 5 a flywheel 6 arranged to rotate in relatively close proximity to a ring 7 at the lower wall portion of chamber 3. Projecting from the ring are a suitable plurality of serrated shredder elements 8 with which cooperate the impellers 9 of the flywheel 6. A lower casing 10 houses the motor and a casting forming a drainage chamber 11. A discharge pipe 12 has conventional means for connection to the trap 14 communicating with the plumbing waste system 15, as is well understood. The means for securing the disposer to the sink include a sleeve 16 having a flange resting on the sink bottom as shown in Fig. 3, a clamping ring 17 having the interposed gasket 18 and a rigid support ring 20 which rests upon a snap ring 21 seated in a groove in the side wall of sleeve 16. When the several parts are assembled with respect to the kitchen sink drain, as noted in Fig. 3, and the screws 22 made up, the assembly becomes securely fastened to the sink. Resilient gasket 23 is then applied and the flanged end 24 of chamber 3 positioned as shown, whereupon nuts 25 are made up and the attachment is complete.

Sleeve 16 removably carries a closure 26 on lugs 27 projecting inwardly from diametrically opposite wall portions of the sleeve (see Fig. 2) and cooperating with grooves 28 in the outer walls of cam portions 30 extending downwardly from the opposite sides of the closure. A handle 31 secured to the closure plate 32 extends across a central opening 33 therein. A stopper plug 34 is carried by a shaft 35 projecting freely through a bar 36 extending between the vertical side portions of handle 31, as shown in Fig. 6. When the closure is to be used as a sink stopper, it is removed from the sleeve after first twisting the handle to disengage the closure from the lugs 27. The closure is then turned handleside down and returned to position within the sleeve. The beveled rim of the plate 32 seats on the shoulder 37 near the base of the sleeve and the stopper seats by gravity on the beveled rim defining the opening 33.

To bring water into the chamber 3 during operation of the machine, there is provided an inlet fitting 38 which extends through the side wall of the chamber casting and terminates in a slotlike mouth 40. The upwardly facing elbow 41 is arranged to be supplied with water under control of a solenoid operated valve 42 having an inlet 43 connected to a source (not shown) of cold water. Outlet 44 from valve 42 discharges into elbow 41 as best shown in Fig. 1. Valve 42 may be of any commercially available type; a suitable valve is illustrated in U. S. Patent 2,305,151, issued December 15, 1942, to George C. Fields. It is contemplated that the valve will be closed when the solenoid is de-energized.

As is usual with garbage disposer apparatus, I provide manually controlled switch means to start and stop the motor under normal operation conditions. Specifically, I mount within a housing 45 provided at a side of the chamber 3 a single throw switch 46 of the well known tumbler type and provide for manually operating said switch by a forked-end arm 47 fixed to a rock shaft 48 rotatably carried in a gland 50 extending through the chamber wall. The end of rock shaft within the chamber terminates in a crank 51 extending below one of the cam legs 30 of the closure 26 as clearly appears in Fig. 3. A spring 52 biases arm 47 into rotation urging the engaged switch actuator 53 to "off" position. In such position the crank 51 is vertical and slightly removed from the cam leg 30, as shown in Fig. 4. The respective cam portions of each leg 30 have a sloping face 30.1 leading to a detent position 30.2 as best appears in Fig. 6. Therefore, when the closure, as positioned in Fig. 3, is rotated counterclockwise, the face 30.1 will engage the crank 51 and rotate it clockwise until the detent 30.2 comes into registry with the projection of the crank. During this operation arm 47 will throw switch actuator 53 to closed-circuit position.

The foregoing structure is based on known waste disposer practices and forms no part of the present invention.

The electrical system as presently constituted comprises the manually operable line switch as aforesaid, the usual combination starting switch and thermally actuated overload cutout, and a pair of stepping relays, one of which establishes a reversing circuit for the motor whenever the current demand of the motor reaches a level characterized by abnormal motor load, such as imposed by the jamming of waste food in the chamber. The other stepping relay indexes each time the said abnormal load condition occurs, and eventually opens a master line switch which requires manual resetting in order again to operate the disposer. It should be noted that after the apparatus has been started by manual operation of the first-named line switch, it will in most instances dispose of the charge of waste material and run until the operator manually opens switch 46 by operation of the closure in suitable direction. However, if the motor stalls under a jam condition, the motor will apply power to the flywheel in alternate directions of rotation. If the jam has not broken after a predetermined maximum number of reversals, the motor circuit is automatically opened at a master line switch to avoid damage to the apparatus.

The starting and overload cutout switch 54 comprises an electromagnetic coil 55 having a magnetic plunger 56 cooperating with a spring contact 57 to bias said contact away from a fixed contact 58 when coil of 55 is de-energized or energized below a certain predetermined hold-in level. Retraction of plunger 56 by electromagnetic action releases spring 57 to assume a normal closed-circuit relationship with contact 58. A bimetal contact 60 is in normal closed-circuit relationship with a fixed contact 61 but is arranged to flex away from said contact upon being heated by the heating element 62 when said element is drawing an abnormal amount of current under motor overload conditions.

The respective stepping relays are conventional ratchet relays such as the "Guardian" series 120 relays manufactured by the Guardian Electric Manufacturing Company of Chicago, Illinois. A typical relay 63, Fig. 4, includes an electromagnetic coil 64, armature 65, ratchet 66, and pawl 67, the latter being carried by armature 65 as clearly appears. A suitably configurated cam (see Fig. 7) on the ratchet shaft 68 cooperates with a cam follower (not shown) which operates one or more switch elements according to the service requirements. For example, assuming that relay 63 comprises the master control relay which opens the circuit after a predetermined maximum number of reversals of the drive motor, its switch organization 70 would be single throw, normally open, and its cam 71 would have a single drop 72 into which the follower would fall to cause the switch circuit to open. On the other hand, reversing switch relay 73 would have a double throw switch organization and its cam 74 would have diametrically opposite pairs of high and low areas to effect a total of four motor circuit reversals. It will be understood that in the schematic showing of Fig. 7, it is intended that the coil 64 of relay 63 will drive the pawl 67 downwardly to rotate shaft 68 counterclockwise of said figure, and similarly coil 75 of relay 73 will drive the pawl 76 downwardly to rotate ratchet 77 and the cam 74 counterclockwise. In each case, suitable spring means, such as spring 69 of relay 63, restores the armature and pawl for the next action. To indicate the status of the contact of relay 63, I extend the cam shaft 68 thereof through a suitable opening in the cover 80 of the control housing and removably mount on the end of the shaft a knob 81 which indexes with the "off" and "reset" legends on a plate 82 fixed to the face of the cover 80. It is intended that the plate will face forwardly below the sink so that the knob position will be easily ascertainable to the operator and the knob accessible for manual adjustment. In cabinet sinks it is well known that doors or equivalent are provided for access to the cabinet space within which the waste disposal apparatus is mounted.

The operation of the control system will best be understood by the wiring diagram of Fig. 7. Assuming the chamber 3 is loaded with food waste for disposal, the operator first notes the position of the knob 81. If it is not on "reset," he manually rotates the knob to this position. This, of course, rotates the cam 72 to the position of Fig. 7 in which the switch organization 70 is closed. The operator then positions the closure 26 within the sleeve and moves it to "on" as established by the indexing arrow on the handle and the legend on the flange of the sleeve. This operation moves switch 46 to closed-circuit position. The solenoid valve circuit becomes closed through the obvious circuit shown in Fig. 7 and water flows into the chamber through the inlet 41. The motor 4 is energized through switch 46, conductors 83, 84, bimetal 60, heater 62, coil 55, conductor 85, running winding R, and switch 70 to the other side of the power supply. The normal starting current of the usual waste disposer motor is approximately 20 amperes, and coil 55 is thereby energized sufficiently to attract the plunger 56, permitting contacts 57 and 58 to close. A starting-winding circuit is then established from switch 46, bimetal 60 and heater 62, the contacts 57 and 58, conductor 86 to the reversing switch bank of relay 73, contacts 87 and 88 thereof, conductor 90, start-winding S and capacitor C, conductor 91, contacts 92 and 93 of the switch bank of relay 73, and conductor 94 to switch 70 and the other side of the power supply. Coil 55 has very low resistance, whereas coils 64 and 75 are each of high resistance— for example, four or five hundred ohms—and therefore so long as coil 55 provides a circuit path, coils 64 and 75 are shunted out and cannot energize sufficiently to attract their respective armatures. As the motor starts, its current demand drops to the running level of about 5 amperes, and coil 55 is unable to hold plunger 56 which drops to separate contacts 57 and 58. This cuts out the starting coil circuit as is well understood. Under normal circumstances the charge of waste is disposed of without incident and in due course the operator rotates handle 31 to the "off" position thereby opening the line switch 46.

If the motor 4 becomes abnormally overloaded—for example, if flywheel 6 should jam because of hard material becoming clogged between an impeller 9 and a shredder pad 8, or for other reasons, the current drawn by the motor rises sharply—for example to 35 or 40 amperes. Heating element 62 quickly raises the temperature of bimetal 60 which deflects away from contact 61 breaking the circuit to coil 55. The momentarily attracted plunger 56 again is released to strike spring 57, opening the starting winding circuit. Coils 75 and 64, however, become energized respectively through conductors 95 and 96 and 83 and 86. Each of the said coils drives its associated ratchet and cam through the arc determined by armature movement and pawl position. The movement of cam 71 has no effect on switch 70 which remains closed. At relay 73, however, it will be understood that rotation of cam 74 will cause the cam follower to drop from a high point to a low point of the cam and in so doing, separate contacts 87 and 88 and 92 and 93, and engage contacts 86 and 97 and contacts 92 and 98. In a very few minutes the bimetal 60 returns to normal temperature and recloses the circuit of coil 55. This again shunts out the relay coils 75 and 64 permitting their respective armatures to return as directed by the associated biasing springs. Contacts 57 and 58 reclose. At this time, however, the current is applied to the start winding in the opposite direction as is readily apparent.

The motor attempts to drive the flywheel in the opposite direction. If this breaks the jam, the disposer operation proceeds in normal fashion until all of the waste has been eliminated. However, if the jam persists, the bimetal contact again breaks the circuit of coil 55 permitting relays of 73 and 63 again to pulse. Relay 73 again sets up a reversing circuit and relay 63 merely advances its cam a fraction of a revolution without change of the condition of switch 70.

The number of attempts to break the jam by reversing the motor should not be more than four. Assuming that each actuation of relay 73 rotates its cam 74 one-quarter turn, so as successively to bring the high and low cam portions into cooperation with the cam follower, each operation of relay 63 should advance its cam 71 one-fifth rotation, so that the fifth actuaion will bring the low spot of cam 71 below its cam follower. As the follower drops, switch 70 will open, permanently opening the circuit. This situation will be evidenced by the advance of the knob 81 to registry with the "off" marking on plate 82.

It will be noted that the water valve solenoid remains energized until either switch 46 or switch 70 is opened. It is considered advantageous for water to continue to flow into the chamber during attempts of the flywheel to reverse because it has been noted that frequently the submergence of the waste matter in water sufficiently softens it so that the motor power is enabled to break through the obstruction and continue the normal operation of the disposer.

While there has been described what is at present considered to be the preferred embodiments of the invention, it will be understood that various modifications may be made therein, and it is intended to cover in the appended claims all such modifications as fall within the true spirit and scope of the invention.

I claim:

1. In waste disposal apparatus having a chamber to receive food waste, means for introducing water into said chamber, electromagnetically operated valve means for controlling water flow, mechanical comminution means within said chamber to reduce said waste to small particle size for expulsion therefrom in water, a reversible motor for driving said comminution means, and an electrical circuit for connecting said motor across a source of electrical energy: control means including switch means in series in said motor circuit, means for operating said switch from a normally closed to a temporarily open-circuit position following a sustained motor energy demand substantially above that required for motor operation under its designed rated load, a motor-reversing switch in said motor circuit, means including an electromagnetic coil for operating said motor-reversing switch from one to another closed-circuit position, said electromagnetic coil being shunted across said first-named switch means for energization at reversing switch operating level during the open-circuit status of said first-named switch, an energizing circuit for said electromagnetically operated valve, a master switch common to said motor circuit and said valve-energizing circuit, cam means for operating said master switch from closed to open-circuit position, pawl and ratchet means for rotating said cam in short increments to switch-opening position, and electromagnetic means in circuit with said reversing switch actuating coil to operate said pawl and ratchet means once at each operation of said reversing switch.

2. In waste disposal apparatus having a chamber to receive food waste, means for introducing water into said chamber, electromagnetically operated valve means for controlling water flow, mechanical comminution means within said chamber to reduce said waste to small particle size for expulsion therefrom in water, a reversible motor for driving said comminution means, and an electrical circuit for connecting said motor across a source of electrical energy: control means including switch means in series in said motor circuit, means for operating said switch from a normally closed to a temporarily open-circuit position following a sustained motor energy demand substantially above that required for motor operation under its designed rated load, a motor-reversing switch in said motor circuit, means including an electromagnetic coil for operating said motor-reversing switch from one to another closed-circuit position, said electromagnetic coil being shunted across said first-named switch means for energization at reversing switch operating level during the open-circuit status of said first-named switch, an energizing circuit for said electromagnetically operated valve, a master switch common to said motor circuit and said valve-energizing circuit, cam means for operating said master switch from closed to open-circuit position after a predetermined angular rotation, and electromagnetically operated means for rotating said cam means in steps comprising a fraction of said angular rotation, said electromagnetic means being in circuit with said reversing switch-actuating coil for energization simultaneously therewith.

3. In waste disposal apparatus having a chamber to receive food waste, mechanical comminution means within said chamber to reduce said waste to small particle size for expulsion therefrom, a reversible motor for driving said comminution means, and an electrical circuit for connecting said motor across a source of electrical energy: control means including switch means in series in said motor circuit, means for operating said switch from a normally closed to a temporarily open-circuit position following a sustained motor energy demand substantially above that required for motor operation under its designed rated load, a motor-reversing switch in said motor circuit, means including an electromagnetic coil for operating said motor-reversing switch from one to another closed-circuit position, said electromagnetic coil being shunted across said first-named switch means for energization at reversing switch operating level during the open-circuit status of said first-named switch, a master switch in said motor circuit, cam means for operating said master switch from closed to open-circuit position, electromagnetically operated means for rotating said cam means to switch-opening position in step-by-step fashion, said electromagnetically operated means being in circuit with said reversing switch actuating coil for energization simultaneously therewith, and means for manually restoring said master switch to closed-circuit position.

4. In a waste disposal apparatus having means for mechanically comminuting food waste and a reversing motor for driving said comminution means, the motor-energizing circuit including individual circuits for energizing motor starting and running windings; a control system including a starting relay having an electro-magnetic coil responsive to the inrush current characteristic of starting said motor under loads not substantially greater than its designed load to close a normally open switch in said starting winding circuit and returning said switch to open-circuit condition as the motor current demand subsides to normal operation levels, thermally actuated switch means responsive to sustained motor current demand at or above the aforesaid normal motor starting demand to de-energize said electromagnetic coil for a predetermined interval, motor-reversing means including a reversing switch in said starting winding circuit, an electromagnetic coil shunted across said first coil, means actuated by said shunted coil for operating said reversing switch from one to another closed-circuit position upon energization of said coil accompanying de-energization of said first coil, a manually controllable switch in said motor circuit, a master switch in said motor-energizing circuit, and electromagnetically operated means in circuit with said reversing switch actuating coil to operate said master switch to open-circuit position following a predetermined number of operations of said reversing switch.

5. In a waste disposal apparatus having means for mechanically comminuting waste materials and a reversing motor for driving said comminution means, the motor-energizing circuit including individual circuits for energizing motor starting and running windings; a control system including a starting relay having an electromagnetic coil responsive to the inrush current characteristic of starting said motor under loads not substantially greater than its designed load to close a normally open switch in said starting winding circuit and returning said switch to open-circuit condition as the motor current demand subsides to normal operation levels, thermally actuated switch means responsive to sustained motor current demand at or above the aforesaid normal motor starting demand to de-energize said electromagnetic coil for a predetermined interval, motor-reversing means including a reversing switch in said starting winding circuit, an electromagnetic coil shunted across said first coil, and means actuated by said shunted coil for operating said reversing switch from one to another closed-circuit position upon energization of said coil accompanying de-energization of said first coil.

6. Control means for a reversible motor subject to operation under loads including a locked rotor condition, said motor having both starting and running windings connected across a source of electrical energy; comprising an electromagnetic coil in series in said running winding circuit, normally open-switch means in said starting winding circuit, means responsive to energization of said coil above a predetermined level to close said switch means, a reversing switch in said starting winding circuit, an electromagnetic coil shunted across said first-named coil, said second coil having an electrical resistance greatly in excess of said first coil, means responsive to energization of said second coil to operate said reversing switch, and means responsive to the sustained application of electrical energy in said running winding circuit characteristic of a locked rotor condition to de-energize said first coil for an interval, whereupon said second coil will become energized to operate said reversing switch.

References Cited in the file of this patent

UNITED STATES PATENTS

| Number | Name | Date |
|---|---|---|
| 2,225,171 | Hammes | Dec. 17, 1940 |
| 2,232,545 | Lum | Feb. 18, 1941 |
| 2,594,974 | Mylting | Apr. 29, 1952 |